United States Patent

[11] 3,561,704

| [72] | Inventor | Carsten Schulze<br>Renton, Wash. |
|---|---|---|
| [21] | Appl. No. | 743,727 |
| [22] | Filed | July 10, 1968 |
| [45] | Patented | Feb. 9, 1971 |
| [73] | Assignee | Vereinigte Flugtechnische Werke<br>Gesellschaft mit beschrankter Haftung<br>fruher Weser Flugzeugbau Focke-Wulf<br>Heinkel Flugzeugbau<br>Bremen, Germany |
| [32] | Priority | July 14, 1967 |
| [33] |  | Germany |
| [31] |  | P 1531467 |

[54] ARRANGEMENT OF THE OPENINGS TO LOADING COMPARTMENTS IN VERTICAL TAKE OFF AND LANDING AIR VEHICLES
1 Claim, 2 Drawing Figs.

[52] U.S. Cl. .................................................... 244/137
[51] Int. Cl. ........................................................ B64c 1/14,
B64d 29/00

[50] Field of Search............................................ 244/137,
53, 54, 55, 56, 58, 118, 117, 129

[56] References Cited
UNITED STATES PATENTS

| 3,051,419 | 8/1962 | Weiland et al................ | 244/118(X) |
| 3,084,888 | 4/1963 | Hertel........................... | 244/56(X) |

*Primary Examiner*—Milton Buchler
*Assistant Examiner*—James E. Pittenger
*Attorney*—Walter Becker ABSTRACT: An airplane adapted to vertical take off and landing which includes a fuselage comprising cargo chamber means having opening means for loading cargo into and unloading cargo from said cargo chamber means, and means pivotally connected to said fuselage, said last mentioned means comprising lifting means and simultaneously forming closing hatch means for selectively opening and closing said opening means.

PATENTED FEB 9 1971

3,561,704

Inventor:
Carsten Schulze
By
Walter Becky

ARRANGEMENT OF THE OPENINGS TO LOADING COMPARTMENTS IN VERTICAL TAKE OFF AND LANDING AIR VEHICLES

The present invention concerns an arrangement of openings for loading compartments in vertical starting and landing air vehicles with lift fan or lift engine means adapted to be moved into and out of the fuselage.

Various types of vertical starting and landing airplanes are known in which lift fan or lift engine means are provided which are adapted to be moved into and out of the fuselage. It is furthermore known for loading and unloading airplanes to provide openings to loading compartments which openings are preferably arranged in the sidewalls of the fuselage, in the stern of the fuselage, or in the bottom of the fuselage. Openings for lifting units adapted to be pivoted into the fuselage, and also openings for the loading chamber require an interruption in the structure so that the forces acting upon the fuselage can be absorbed by the structure surrounding such openings.

The heretofore known separate arrangement of the cutouts in the fuselage for lifting units and for loading compartments thus makes necessary considerable structural and technical means and expenses in order to master the unfavorable effects exerted by a number of cutouts in the fuselage upon the rigidity of the airplane fuselage.

It is, therefore, an object of the present invention to provide a fuselage with cutouts for the above mentioned purposes which will overcome the drawbacks outlined above.

It is another object of this invention to provide a fuselage with cutouts for lifting units and loading chambers which will result in an improved and less expensive construction for the fuselage.

These and other objects and advantages of the invention will appear more clearly from the following specification, in connection with the accompanying drawing, in which.

Figure 1:
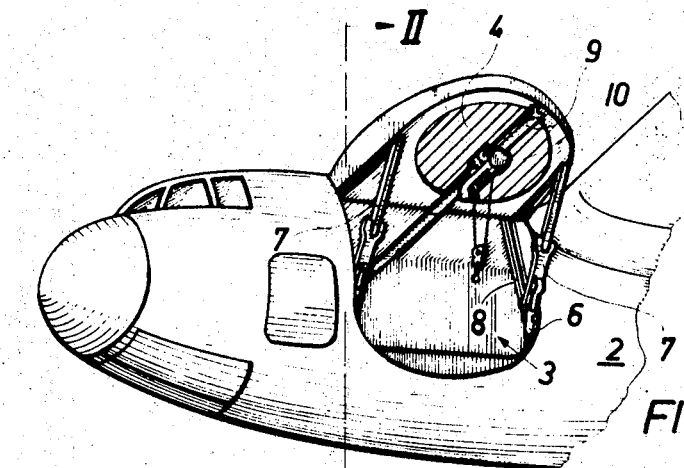
FIG. 1 is a perspective view of the arrangement of the opening for a loading compartment.
Figure 2:
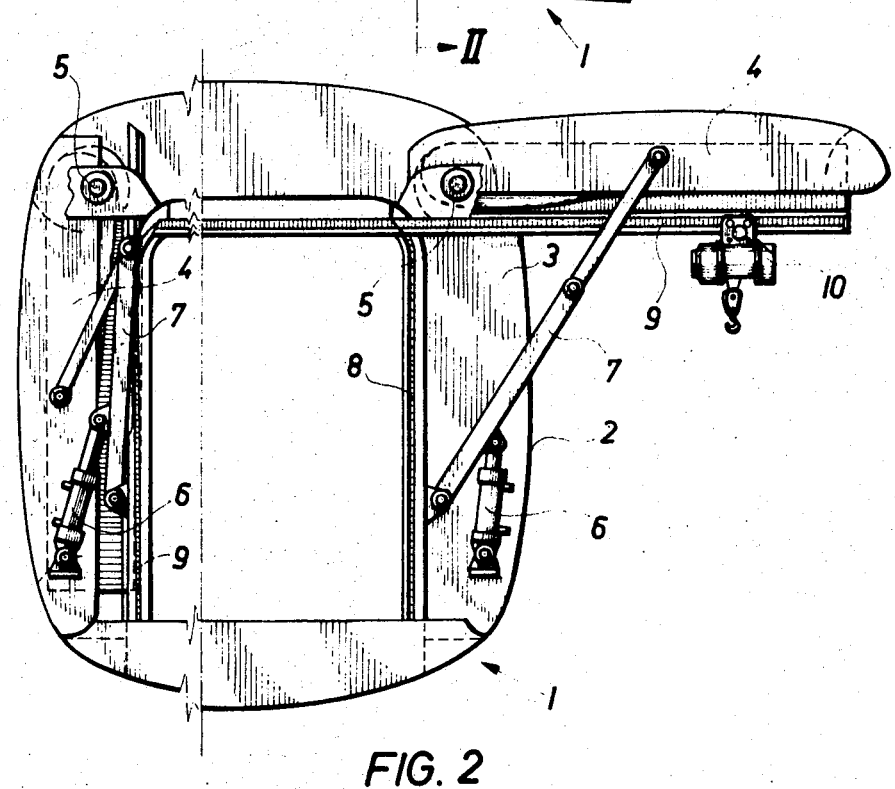
FIG. 2 represents a section through the fuselage along the line II–II of FIG. 1 showing the lifting blower on the left side in closed and on the right side in open position.

The objects underlying the present invention have been realized by designing the fuselage cutouts for the lift fan or lift engine means simultaneously as openings for the loading compartments while the lift fan or lift engine means are adapted to close the openings of the loading compartments and are also adapted to release the closing hatch.

Preferably, the fuselage cutouts for the lift fan or lift engine means are arranged in the sidewalls of the fuselage. In order to avoid that the lifting units interfere with the loading and unloading of the airplane, the lift fan or lift engine mechanism is, in an advantageous manner, adapted to be pivoted out of the fuselage cutouts about an axis which extends in the longitudinal direction of the airplane and is located at the upper edge of the fuselage cutout.

According to a further development of the invention, the lift fan or lifting mechanism has arranged thereon, supporting elements such as hoisting means for aiding in the loading and unloading operations.

Referring now to the drawing in detail, the fuselage 1 has its sidewalls 2 provided with cutouts 3. These cutouts 3 receive the lifting blowers or lift fans 4 which are adapted to pivot into and out of the fuselage. The blowers or fans 4 are connected to the fuselage 1 by means of shafts 5 which extend in the longitudinal direction of the airplane and are arranged at the upper edge of the fuselage cutouts 3. A linkage system 7, which is operable by a hydraulic cylinder piston system 6 is adapted to move the lifting blowers or fans 4 into their effective position shown in the drawing, and also to their closing position, in which said blowers or fans 4 operate loading compartment motors. The fuselage cutouts 3 thus serve simultaneously as loading compartment openings and free the axis to the interior of the inner chamber of the fuselage in the effective position of the lifting blowers. To protect the interior of the fuselage against the jets of the lifting blowers or lift fans, the said inner chamber of the fuselage is, during the starting and landing operation, closed by an inner door 8.

Furthermore, the bottom side of the lifting blowers or lift fans 4 is provided with holding means 9 in the form of rails for a hoist 10. These rails are adapted to be folded inwardly into the fuselage prior to starting the lifting blower 4.

During the loading and unloading of the airplane, the blowers or fans 4 supported by the hydraulic cylinder piston system 6 and the linkage 7 occupy their effective i.e. pivoted-out position in which they free the openings 3 to the loading compartment. When the loading operation has been completed, the inner door 8 is closed and the airplane is ready to start. After the vertical starting has been completed and the airplane is cruising, the lifting blowers or fans 4 are tilted back into the fuselage 1 whereby a closed outer contour will be obtained.

The preparation for the landing and the unloading operation is effected in an inverse manner.

The blowers or fans 4 may in a corresponding form and differing from the embodiment shown in the drawing also be so arranged as to be pivotable about shafts which extend parallel to the vertical axis of the airplane and are located at the edge of the fuselage cutouts 3. Furthermore, the cutouts 3, in cooperation with correspondingly designed lifting blowers lift fans may also be arranged in the bottom of the fuselage.

It will be understood that the embodiment of the invention as shown in the drawing has been illustrated merely by way of example and that numerous modifications within the framework of the invention will suggest themselves to an expert in this art.

I claim:

1. An airplane adapted to vertical take off and landing, which includes in combination: a fuselage comprising cargo chamber means having opening means for loading cargo into and unloading cargo from said cargo chamber means, and integrated means pivotally connected to said fuselage, said last-mentioned means comprising lifting fan means joined with and simultaneously forming unified closing hatch means for selectively opening and closing said opening means and which includes hoist means attached to the underside of said hatch means and movable relative thereto.